Figure 1:
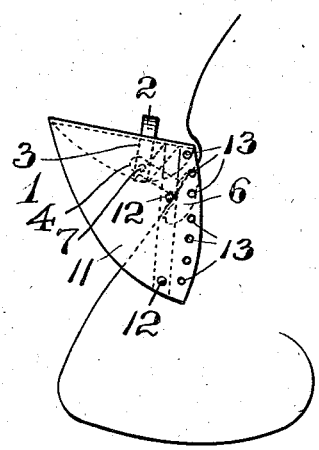

S. H. DICE.
EYE SHADE.
APPLICATION FILED APR. 14, 1908.

918,975.

Patented Apr. 20, 1909.
2 SHEETS—SHEET 1.

WITNESSES:
F. H. W. Fraentzel
Anna H. Alter

INVENTOR:
Samuel H. Dice,
BY
Fraentzel and Richards,
ATTORNEYS

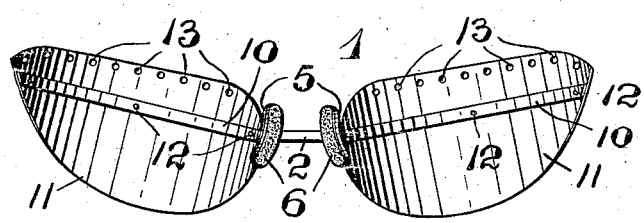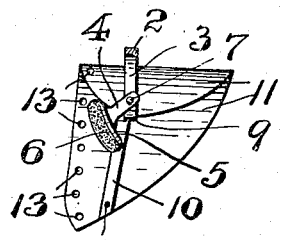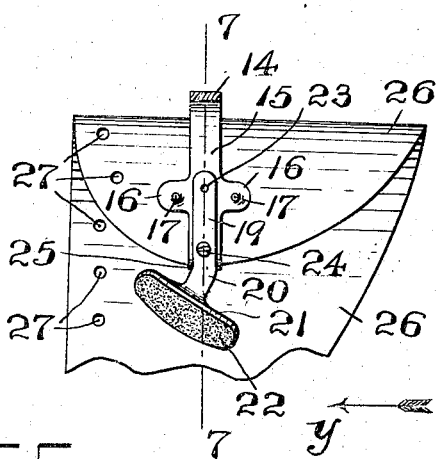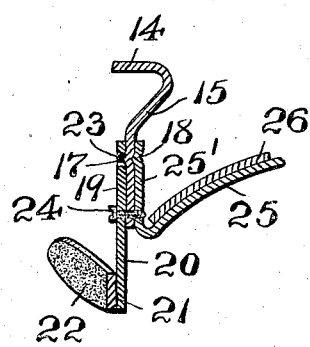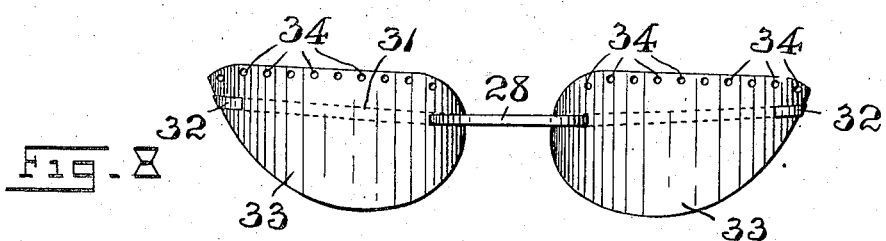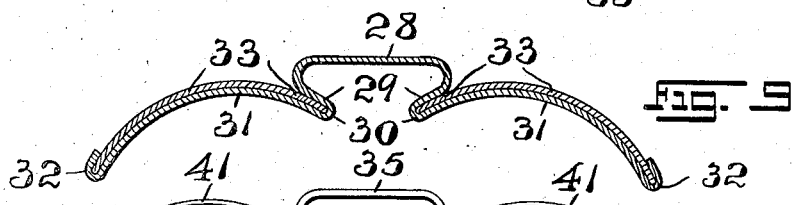

UNITED STATES PATENT OFFICE.

SAMUEL H. DICE, OF NEWARK, NEW JERSEY.

EYE-SHADE.

No. 918,975.      Specification of Letters Patent.      Patented April 20, 1909.

Application filed April 14, 1908. Serial No. 426,931.

*To all whom it may concern:*

Be it known that I, SAMUEL H. DICE, a citizen of the United States, residing at Newark, in the county of Essex and State of New Jersey, have invented certain new and useful Improvements in Eye-Shades; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in eye-shades; and, this invention has reference, more particularly, to a novel construction of eye-shade which is light in weight, is durable, and is easily and quickly adjustable, so as to be secured in its position over the bridge of the nose and in front of the eyes for the purpose of shading or protecting the latter from the glare of the direct rays of light, while the wearer of the eye-shade is reading, writing, drawing, or otherwise using the eyes under a working strain.

The invention has for its principal object to provide a novel construction of eye-shade of the general character hereinafter set forth, which is simple in its construction, and provides an eye-shade which, while protecting the eyes from the glare of direct rays of light from natural or artificial sources, does not interfere with or annoy the vision of the wearer.

A further object of this invention is to provide an eye-shade which is light in weight, and is provided with a pair of shades, one for each eye which fits closely around the eye, thereby avoiding the annoyance and discomfort of the old-style eye-shades, which are comparatively heavy and which are clasped around the forehead in such a manner so as to cause discomfort and frequently headaches.

A still further object of this invention is to provide an eye-shade which is not adapted to confine the air around the forehead, thereby being hot and uncomfortable, but which permits a free circulation of air about the face, thereby being cool and comfortable to the wearer; and, furthermore, to provide an eye-shade which comprises a pair of independent shading members or elements, one for each eye, and a connecting mounting, comprising a nose-ridge and nose-guards for arranging the device in its position upon the nose.

The invention has for its further object to provide an eye-shade of the general character herein set forth in which the independent eye-shades, as well as the nose-guards, are each adjustable with relation to the nose-bridge, and independently of each other, so that the eye-shades can be readily fitted to any shape of nose.

Other objects of this invention not at this time more particularly enumerated will be clearly understood from the following detailed description of the same.

With the various objects of the present invention in view, the said invention consists, primarily, in the novel eye-shade hereinafter set forth; and, the invention consists, furthermore, in the novel arrangements and combinations of the various devices and parts, as well as in the details of the construction of the same, all of which will be more fully described in the following specification, and then finally embodied in the claims which are appended to and which form an essential part of this specification.

The invention is clearly illustrated in the accompanying drawings, in which:—

Figure 2:
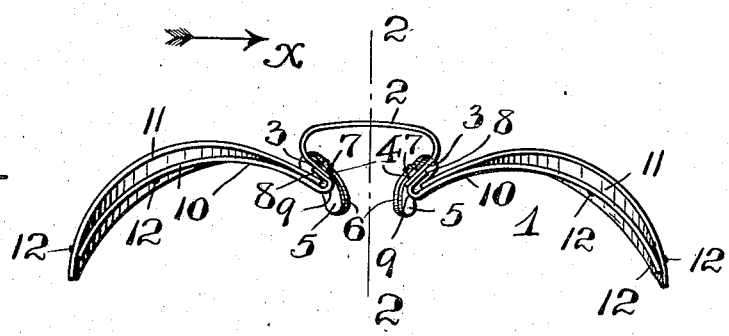
Figure 3:
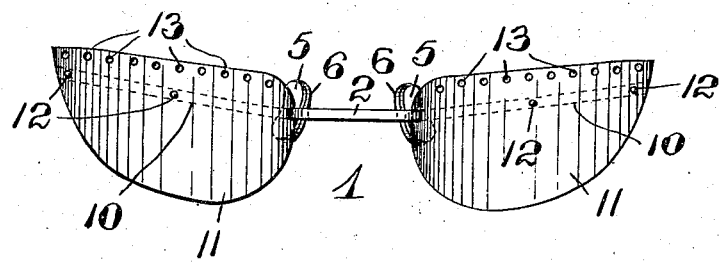

Figure 1 is a profile view of the nose of the wearer of the novel eye-shade, and side view of the eye-shade, the same being illustrated in its normal position upon the nose of the wearer, and around and above the eyes. Fig. 2 is a front view of the eye-shade; and Fig. 3 is a top or plan view of the same. Fig. 4 is a back or bottom view of the eye-shade; and Fig. 5 is a transverse vertical section of the same, said section being taken centrally across the nose-bridge and looking toward one of the shade-members. Fig. 6 is a view similar to that shown in said Fig. 5, but illustrating a modified construction of mounting and a means for adjustably connecting both the nose-guards and the eye-shades to the mounting; and Fig. 7 is a detail vertical longitudinal section of the same, said section being taken on line 7—7 in said Fig. 6, looking in the direction of the arrow *y*, and both of said views being made on an enlarged scale. Fig. 8 is a top view of a modified form of eye-shade, but still embodying the principal features of the present invention; and Fig. 9 is a longitudinal vertical section of the same. Fig. 10 is a front edge view of another modified form of eye-shade embodying the principles of the present invention.

Similar characters of reference are employed in all of the above described views to indicate corresponding parts.

Referring now to the several figures of the drawings, the reference-character 1 indicates one form of eye-shade embodying the principles of the present invention, the same comprising a suitably formed nose-bridge or piece 2, preferably made of flat spring-metal, and being provided with downwardly extending arms or bent members 3. Pivotally secured to the free ends of the downwardly extending arms 3 of the nose-piece or bridge 2, and upon either, but preferably the inner faces thereof, are a pair of suitably formed nose-guards comprising inwardly extending arms or portions 4, the free ends of which are formed with suitable seats or members 5; and, arranged upon the inner surfaces of said seats 5 are suitable nose-grips 6, which are secured thereto in any suitable manner. The said nose-grips 6 may be made of any resilient material, such as rubber, leather, chamois, or the like, or they may be made of non-resilient material such as tortoise-shell, celluloid, hard-rubber or similar material, as preferred. The said nose-guards are held in their pivotal arrangement upon the downwardly extending arms 3 of the nose or bridge-piece 2 by means of a screw or rivet 7, or any other suitable fastening means; and, these same screws or rivets 7 also serve to rigidly secure to the outer sides of the downwardly extending arms 3 of the nose or bridge-piece 2, the inner end-members or portions 8 of the preferably U-shaped ends 9 of suitable shade-supports or bars 10. The said shade-supports 10 are preferably made of flat metallic strips which are bowed or bent so as to serve as mountings for a pair of independent shade or eye-members 11, which are secured thereto preferably by means of fastening pins or rivets 12, or any other suitable means, and are of a concavo-convex shape adapted to conform with the brow, or that portion of the forehead, of the wearer immediately above each eye-socket. Each shade-member 1 is preferably made of any suitable light opaque material, such as celluloid, leatheroid, cardboard, or the like, and furthermore said shade-members 11 may be provided with the air-circulating holes or perforations 13 when desired.

As will be clearly understood from the foregoing description of the novel construction of eye-shade embodying the principles of the present invention, the said eye-shade is constructed so as to be secured upon the nose of the wearer in much the same manner as ordinary eyeglasses, namely by means of a pince-nez frame-construction. The nose-guards are pivotally arranged upon the arms 3 of the bridge-piece 2, so as to provide for sufficient adjustment and regulation to accommodate different wearers, there being sufficient friction between the inwardly extending arms or portions 4 of the said nose-guards and the arms for portions 3 of the nose or bridge-piece 2, to retain the said nose-guards in any desired adjustment or position, as will be clearly evident.

Referring now more particularly to Figs. 6 and 7 of the accompanying drawings, there is illustrated therein a modified construction of nose-guards and nose or bridge-piece. This said modification comprises the bridge-piece 14 provided with downwardly extending arms or portions 15. The said downwardly extending arms 15 are provided a short distance from their free ends with a pair of outwardly and oppositely projecting lugs or extensions, as 16, each of said extensions 16 being formed with a pressed-out portion or teat 17, and in like manner the downwardly extending arms 15 are provided with a pressed-out portion or teat 18. Pivotally secured to the free ends of the said downwardly extending arms 15 of the nose or bridge-piece 14, and upon the inner sides thereof, are a pair of nose-guards, each nose-guard comprising an upwardly extending arm or member 19, and a downwardly extending arm or member 20, the latter being formed with suitable seats, as 21, and upon which are arranged and secured thereto in any suitable manner suitable nose-grips 22. The upwardly extending arm or portion 19 is provided, near its free end, with a hole or perforation 23. This hole or perforation 23 is adapted to engage with any one of the pressed-out portions or teats 17, according to the position in which the said nose-guards are adjusted, and when so adjusted serves to lock or hold the said nose-guard in that adjusted position. The said nose-guards are held in their pivotal arrangement upon the downwardly extending arms 15 of the bridge-piece 14, by means of a screw or rivet 24, or any other suitable means, and these same screws or rivets 24 also serve to secure to the outer sides of the downwardly extending arms 15 of the nose-bridge-piece 14, the shade-supports 25 to which are secured the shade-members 26 which may also be provided with suitably disposed holes or perforations 27 for ventilation when the eye-shade is worn. As shown in said Fig. 7, each shade-support or mounting 25 is provided with an upwardly extending arm or portion 25' which is formed with a suitably disposed pressed-out portion or teat 18, the raised or pointed part of which can be fitted into the depressed part in the back of any one of the said teats 17, and held in frictional engagement, whereby the support 25 as well as the shade-member 26 can be brought into an adjusted relation, irrespective of the adjustment of the nose-guards, to suit the convenience of the wearer.

Referring now more particularly to Figs. 8 and 9 of the accompanying drawings, there is illustrated therein a modified construction of eye-shade embodying the principles of the present invention. This said modification consists of a frame-portion comprising a nose or bridge-piece 28 provided with downwardly extending arms or members 29 which are suitably bent so as to form U-shaped portions 30, from which extend, in a proper curvature, the shade-supports 31, all of said parts being made from one continuous piece of sheet-metal. The free ends of said shade-supports are bent upwardly to form another U-shaped portion 32. It will be readily seen, that this construction provides a frame-portion with all the parts thereof formed integrally from one piece of material. Shade-members 33 are suitably secured or mounted upon this said frame-portion by being held at their free-ends in frictional engagement with the interior surfaces of the said U-shaped portions 30 and 32. These said shade-members 33 are also provided with a plurality of holes or perforations 34, to permit the circulation of air around the same, when the eye-shade is worn.

Referring now to Fig. 10 of the drawings, there is illustrated therein another modified construction of eye-shade embodying the principles of the present invention, and the same comprises a nose or bridge-piece 35 provided with downwardly extending arms or portions 36. Pivotally secured upon the inner side of each arm 36 by means of a rivet, screw, or pin, as 37, is the connecting arm 38 of a nose-guard. These connecting arms 38 terminate at their free ends in seats 39 upon which are secured, in any suitable manner, the nose-grips 40. Secured to the outer sides of the downwardly extending arms or portions 36 of the nose or bridge-piece 35, by means of the same rivets or screws 37, which serve as the pivots for the nose-guards, are a pair of shade-members 41 mounted and secured upon properly curved shade-supports 42. The said rivets or screws 37 extend through the arms 38, the end-portions of the eye-shades 41 and the supports 42, and thereby thoroughly bind the several parts in their operatively connected relation, substantially as illustrated in the said Fig. 10 of the drawings.

I am aware that changes may be made in the general arrangements and combinations of the devices and parts, as well as in the details of the construction of the same, without departing from the scope of the present invention, as defined in the claims which are appended to this specification. Hence, I do not limit my invention to the exact arrangements and combinations of the devices and parts as described in the foregoing specification, and as illustrated in the accompanying drawings, nor do I confine myself to the exact details of the construction of any of the said parts.

I claim:—

1. As an article of manufacture, an eye-shade comprising a bridge-piece, a pair of nose-guards pivotally secured to said bridge-piece, a pair of shade-members provided with a plurality of perforations near their inner edges, and means for securing said shade-members to said bridge-piece in such a position that each shade-member is adapted to engage with the brow of the wearer directly above the eye-socket.

2. As an article of manufacture, an eye-shade comprising a bridge-piece, a pair of nose-guards pivotally and adjustably secured upon said bridge-piece, a pair of shade-members provided with a plurality of perforations near their inner edges, and means for securing said shade-members to said bridge-piece in such a position that each shade-member is adapted to engage with the brow of the wearer directly above the eye-socket.

3. As an article of manufacture, an eye-shade comprising a bridge-piece provided with downwardly extending arms, a pair of nose-guards secured to said downwardly extending arms, means for adjusting said nose-guards in various positions with relation to said bridge-piece, a pair of shade-members connected with said downwardly extending arms of said bridge-piece, said shade-members being adapted to rest above the eye sockets of the wearer.

4. As an article of manufacture, an eye shade comprising a bridge-piece provided with downwardly extending arms, a pair of nose-guards secured to said downwardly extending arms, said nose-guards comprising downwardly extending arms, grip-seats upon the free ends of said downwardly extending arms, nose-grips secured to said nose-grip seats, and means for adjusting said nose-guards in various positions with relation to said bridge-piece, and a pair of shade-members connected with the downwardly extending arms of said bridge-piece, said shade-members being adapted to rest above the eye-sockets of the wearer.

5. As an article of manufacture, an eye-shade comprising a bridge-piece provided with downwardly extending arms, a pair of nose-guards secured to said downwardly extending arms, said nose-guards comprising downwardly extending arms, grip seats upon the free ends of said downwardly extending arms, nose-grips secured to said nose-grip seats, and means for adjusting said nose-guards in various positions with relation to said bridge-piece, a pair of shade-supports secured to the downwardly extending arms of said bridge-piece, and a pair of shade-members provided with a plurality of perforations near their inner edges, mounted upon said shade-supports, said shade-members being adapted to rest above the eye-sockets of the wearer.

6. As an article of manufacture, an eye-shade comprising a bridge-piece provided with downwardly extending arms, a pair of nose-guards, said nose-guards comprising downwardly extending arms pivotally secured to the inner sides of said downwardly extending arms of the bridge-piece, said downwardly extending arms of said nose-guards being provided at their free ends with grip seats, nose-grips secured upon said seats, and means for adjusting said nose-guards in various positions with relation to said bridge-piece, a pair of curved shade-supports secured to the other sides of the said downwardly extending arms of said bridge-piece, and a pair of shade-members secured upon said curved shade-supports, said shade-members being adapted to rest above the eye-sockets of the wearer.

7. As an article of manufacture, an eye-shade comprising a bridge-piece provided with downwardly extending arms, a pair of nose-guards, said nose-guards comprising downwardly extending arms pivotally secured to the inner sides of said downwardly extending arms of the bridge-piece, said downwardly extending arms of said nose-guards being provided at their free ends with grip seats, nose-grips secured upon said seats, and means for adjusting said nose-guards in various positions with relation to said bridge-piece, a pair of curved shade-supports secured to the other sides of the said downwardly extending arms of said bridge-piece, and a pair of shade-members provided with a plurality of perforations near their inner edges, said shade-members being secured upon said curved shade-supports.

In testimony, that I claim the invention set forth above I have hereunto set my hand this 11th day of April, 1908.

SAMUEL H. DICE.

Witnesses:
    FREDK. C. FRAENTZEL,
    ANNA H. ALTER.